(12) United States Patent
Cockram

(10) Patent No.: US 11,270,475 B2
(45) Date of Patent: Mar. 8, 2022

(54) VARIABLE RENDERING SYSTEM AND METHOD

(71) Applicant: Sony Interactive Entertainment Inc., Tokyo (JP)

(72) Inventor: Philip Cockram, Meopham (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/034,628

(22) Filed: Sep. 28, 2020

(65) Prior Publication Data

US 2021/0097734 A1 Apr. 1, 2021

(30) Foreign Application Priority Data

Oct. 1, 2019 (GB) .................................. 1914139

(51) Int. Cl.
*G06T 11/00* (2006.01)
*A63F 13/52* (2014.01)
*G06T 7/70* (2017.01)

(52) U.S. Cl.
CPC ............ *G06T 11/001* (2013.01); *A63F 13/52* (2014.09); *G06T 7/70* (2017.01); *G06T 2200/24* (2013.01)

(58) Field of Classification Search
CPC .......... G06T 11/001; G06T 7/70; G06T 11/40
See application file for complete search history.

(56) References Cited

U.S. PATENT DOCUMENTS

2019/0026944 A1* 1/2019 Laaksonen .............. G06T 17/05
2019/0172247 A1* 6/2019 Grossman .............. G06T 11/40

OTHER PUBLICATIONS

Extended European Search Report for corresponding EP Application No. 20195514.3, 8 pages, dated Feb. 12, 2021.
Combined Search and Examination Report for corresponding GB Application No. 1914139.9, 9 pages, dated Aug. 11, 2020.
H. Yamamoto, H. Tamura and T. Ohshima, "Gaze-directed Adaptive Rendering for Interacting with Virtual Space," in Virtual Reality Annual International Symposium, Santa Clara, California, pp. 103-111, 1996.

* cited by examiner

*Primary Examiner* — Samantha (Yuehan) Wang
(74) *Attorney, Agent, or Firm* — Matthew B. Dernier, Esq.

(57) ABSTRACT

A system for generating images for display, the system comprising a content identification unit operable to identify content to be displayed, an overlay identification unit operable to identify an overlay to be applied to at least a portion of the content to be displayed, a rasterization rate determining unit operable to determine, in dependence upon the identified overlay, a rasterization rate to be applied to each of two or more areas of at least a frame of the content to be displayed, a rendering unit operable to render the content to be displayed in accordance with the determined rasterization rates, and an overlay applying unit operable to generate an image by applying the overlay to the rendered image.

11 Claims, 3 Drawing Sheets

VARIABLE RENDERING SYSTEM AND METHOD

BACKGROUND OF THE INVENTION

Field of the Invention

This disclosure relates to variable rendering systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As the complexity and level of detail within computer games and other content relating to virtual environments increases, the amount of processing that must be performed to enable the rendering of image frames for display increases. While in many cases this is able to be offset by advances in the capabilities of processing devices, this is not always possible. For instance, games consoles are examples of rendering devices that have a fixed processing capability (changing only with new iterations of the console, generally after a period of years).

In such cases, it is therefore advantageous to improve the efficiency of the rendering process. This may enable increased performance with fixed or limited hardware, or result in a lower burden being placed on a processing device—this may be further advantageous in reducing the amount of power used or the amount of heat generated by a device, for example.

One previously proposed method of improving the efficiency of a rendering process is that of foveal rendering. This is a technique in which a point of focus of the use is determined on the display using a gaze tracking method (such as cameras that are able to image the user's eyes), and processing is performed so as to provide reduced image quality in regions in which the user is not focused. This method takes advantage of the fact that the human eye cannot see in high-detail across the whole range of vision (such as having low-detail vision in the peripheral areas).

For example, a variable shading rate may be used in conjunction with the identification of the user's gaze direction such that a higher shading rate is used in the foveal region of the viewer's view, and a lower shading rate is used in other areas.

Of course, such a method may not always be appropriate—for instance, it is necessary to be able to obtain gaze tracking information about a viewer (which requires additional hardware) to be able to implement the technique effectively. Additionally, the gaze direction must be updated at an extremely high frequency (at least the frame rate to be used for display) in order for high-quality content to be displayed—this places an additional burden upon the processing unit.

It may therefore be considered advantageous that an improved rendering process is provided which does not rely upon information about the viewer's physical state. This can preclude the need for additional hardware, as well as reducing the rate at which at least a portion of the information for rendering must be generated.

It is in the context of the above problems that the present disclosure arises.

SUMMARY OF THE INVENTION

This disclosure is defined by claim 1.

Further respective aspects and features of the disclosure are defined in the appended claims. It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present disclosure provide a system and method for rendering content using a variable rasterization rate process (this may also be referred to as a variable rate shading process). In particular, these can be provided in the context of content that is displayed with an overlaid GUI element that obscures at least a portion of the display. Examples of such display content are described below, with reference to the Figures.

Rasterization is the process by which the geometry of a scene to be rendered is converted into pixel values so as to enable the generation of images for display. For example, the geometry of the scene may be described using 'primitives', which may be defined as polygons (such as triangles)—however these are not suitably defined so as to be able to generate a direct image output.

In particular, rasterization comprises the generation of pixel information from those primitives, and this process can be performed with a preferred level of detail (as defined by the sample rate). The sample rate is a variable that determines the coarseness of the rasterization process, such that a lower sample rate results in the rasterization being performed on a per-pixel-group basis rather than a per-pixel basis (for example). Of course, any suitable sample rates may be selected.

A variable rasterization process is a process in which different rasterization rates are applied for different areas of an image to be displayed. For example, a higher sample rate may be selected for a first region, with a second region having a lower sample rate. The shading process may be similarly adjusted in line with this, such that shading processes are applied on larger display areas (such as over a group of pixels rather than for individual pixels).

Figure 1:
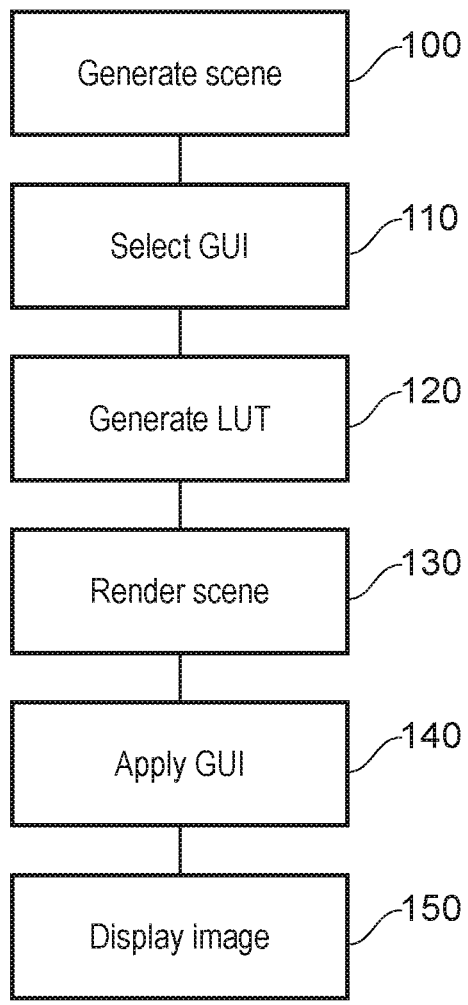
FIG. 1 schematically illustrates a content generation method.

FIG. 1 schematically illustrates a method for generating content in accordance with one or more embodiments of the present disclosure. In this method a variable rasterization process is applied to the content to be displayed, such that one or more portions of the screen which are to be obscured by an overlaid GUI element are rendered with a lower rasterization rate than one or more portions which are not obscured by that element.

Advantageously, this may reduce the processing burden upon a rendering device without causing a noticeable decrease to the displayed image quality (as is described in more detail below). Indeed, the reduction in processing that may result from this method may enable resources to be reassigned for processing other parts of the content so as to generate an improved image for display.

At a step 100, a virtual scene is generated. This may comprise any suitable video or image content over which a GUI element may be overlaid, such as video game content or interactive video content. For example, a three-dimensional scene such as that shown in FIG. 2 may be generated—although of course any suitable scene may be generated.

Figure 2:
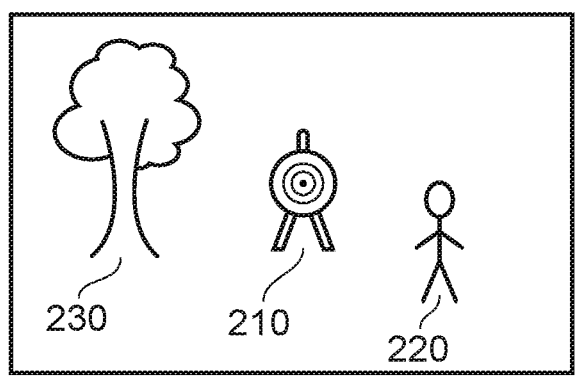
FIG. 2 schematically illustrates a virtual scene.

In FIG. 2, a virtual scene 200 is shown that comprises a target 210, a person 220, and a tree 230. This scene may be presented as a part of a target-shooting game, for example, in which the user is expected to hit to target with a projectile to earn points.

At this stage, the generation of the virtual scene comprises the identification of which objects are present within the camera view; further steps (such as occlusion culling) may also be applied so as to identify which objects are to be displayed in the rendered image.

At a step 110, the GUI element that is to be displayed is identified. In some examples this may be identified in response to a user input; for example a user request for a specific action to be performed or GUI to be displayed, such as a zoom action which causes the display of a scope overlaying the virtual scene. Alternatively, or in addition, the GUI element for display may be identified in response to one or more contextual features within the content to be displayed—for example, the display of a GUI element may be triggered by the appearance of a particular object within the virtual scene, or reaching a particular milestone within the content may trigger the display or modification of the GUI element to be displayed.

The identification in step 110 may comprise the determination of one or more properties of the GUI. These properties may relate to the appearance of the GUI itself, such as colour and/or opacity, and/or the display effects to be provided in other areas of the screen. The size of the GUI may also be determined, as well as any expected motion of the GUI or of elements of the GUI. Based upon the identified properties, the determination of which areas of a displayed image would be obscured and to what degree—this can be used to guide the determination of which areas of an image of the virtual scene to provide using a reduced rasterization rate, and the amount by which the rate is reduced relative to one or more unobscured areas.

Figure 3:
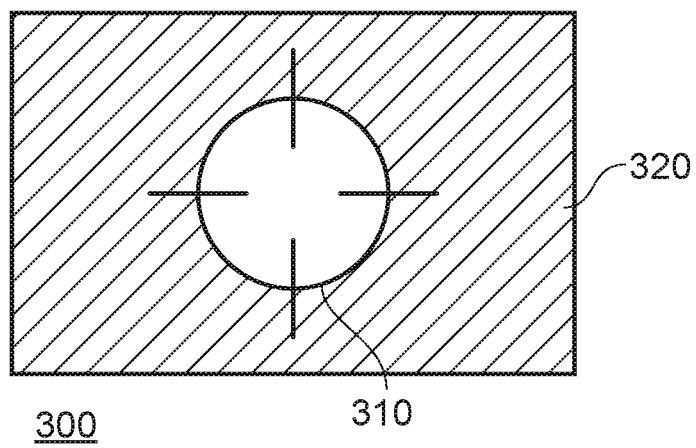
FIG. 3 schematically illustrates a GUI object.

FIG. 3 schematically illustrates an example of a GUI 300 that may be selected for overlay upon the scene 200 of FIG. 2. The GUI 300 comprises a scope or sight element 310, and an obscured region 320 surrounding the element 310 that is configured to mask the virtual scene upon which it is overlaid in an appropriate manner. While represented by hatching in this Figure, the obscured region 320 may instead appear in a displayed image as a blurred and/or darkened image of the visual scene that would otherwise be displayed in that area. Of course, any suitable visual effect may be provided in the region 320 so as to emphasise the content displayed within the bounds of element 310.

At a step 120, a lookup table (LUT) is generated that identifies the rasterization rate to be applied in each of the areas of the image for display. Of course, any suitable storage format may be considered rather than being limited to LUTs—for instance, a map of the display may be generated that identifies regions of differing rasterization rates. It is considered that the LUT comprises information that identifies one or more image portions that would be obscured by the GUI for rendering with a lower rasterization rate, and one or more image portions with a relatively higher rasterization rate.

Figure 4:
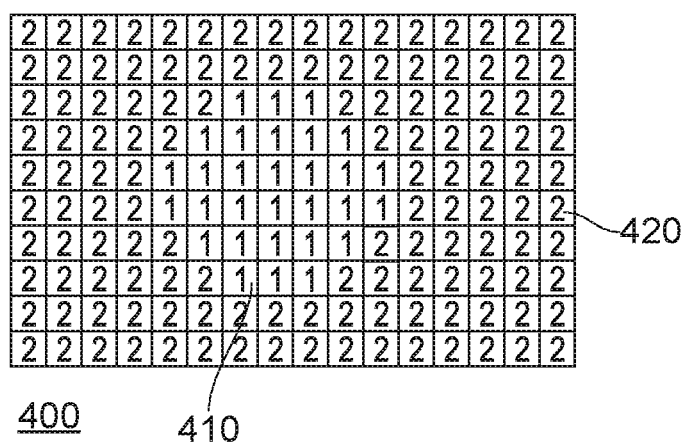
FIG. 4 schematically illustrates a variable rasterization pattern.

FIG. 4 schematically illustrates a table 400 which stores information about the respective rasterization rates to be applied in association with the GUI 300 of FIG. 3. In the table 400, the display area is divided into a number of spatial regions. First regions 410 are denoted with a '1', and these correspond to regions in which the rasterization rate is at a maximum within the display region. Second regions 420 are denoted with a '2', and these correspond to regions in which the rasterization rate is reduced.

At a step 130, the virtual scene generated in step 100 is rendered using the LUT (or an alternative) generated in step 120. This rendering therefore includes the use of a variable rasterization rate that is dependent upon the properties of the GUI that is to be overlaid upon the image, rather than solely in dependence upon any user- or content-related properties. Of course, the rasterization rate may be determined solely in dependence upon the information in the LUT of step 120—such that the properties of the GUI are the only factor considered when determining a rasterization rate to be applied to each of one or more image areas.

In particular, the rendering step 130 may also include the determination of which elements within the virtual scene are visible within an image to be displayed, with those which are obscured (for example, by closer objects) being culled. This can be determined based upon information about the virtual camera position and orientation within a virtual scene, for example.

The rendering step 130 may additionally (or alternatively) include the application of post-processing effects to the image; for example, this may include effects such as anti-aliasing and colour correction. The application of these affects after the use of a variable rasterization rate rendering process may be advantageous in that the total size of the image is reduced, and so the post-processing effects may require less processing.

At a step 140, the GUI is applied to the rendered image so as to obscure one or more portions of the rendered image as desired. Of course, one or more parts of the rendered image should also be visible through the GUI; this may be implemented by adjusting the alpha levels of the GUI, for example. This step may also comprise the rendering of the GUI element itself.

Figure 5:
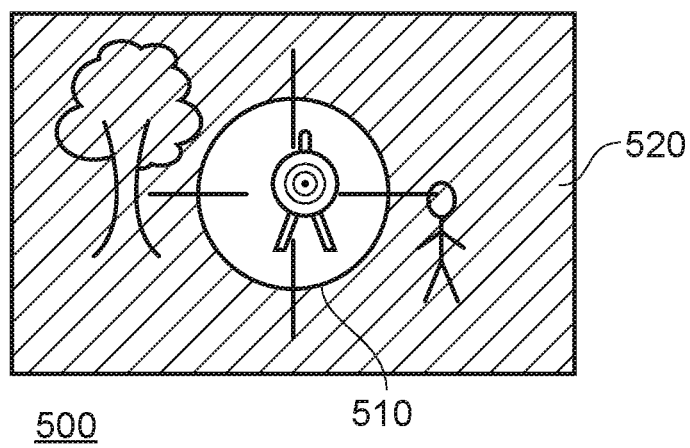
FIG. 5 schematically illustrates a display image.

FIG. 5 schematically illustrates an example of an image for display 500. The image 500 comprises the first region 510 comprising a high-quality view of the virtual scene (that is, a portion of the scene rendered with a high rasterization rate), while a second region 520 comprises a low-quality and obscured view of the remaining parts of the virtual scene (that is, a portion of the scene rendered with a low rasterization rate and with GUI elements overlaid). As noted above the region 520 may be characterised by a darker or blurred appearance, for example.

At a step 150, the generated image (comprising the rendered image of step 130 in conjunction with the GUI as applied to the rendered image in step 140) is displayed. Such a step is of course optional, as instead the image could be transmitted to another device or stored for later use rather than being output for display immediately. In some embodiments, a number of successive generated images may be compressed as a video file for storage or display, for instance.

Figure 6:
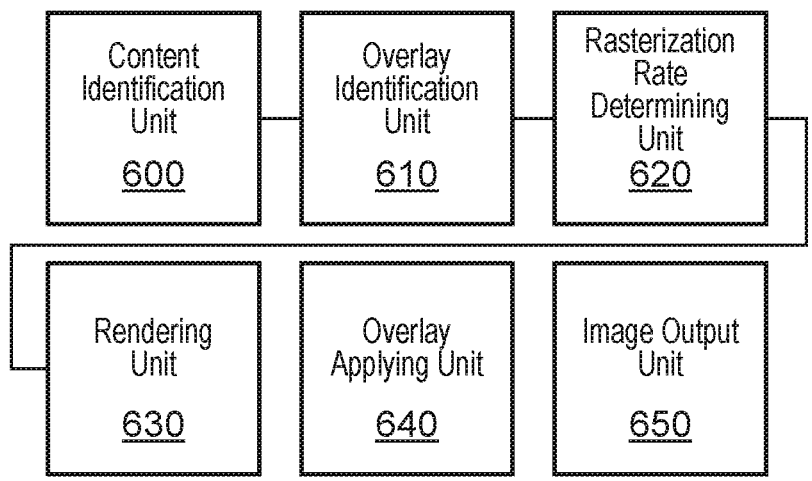
FIG. 6 schematically illustrates a system for generating images for display.

FIG. 6 schematically illustrates a system for generating images for display. The system comprises a content identification unit 600, an overlay identification unit 610, a rasterization rate determining unit 620, a rendering unit 630, an overlay applying unit 640, and an image output unit 650. While shown to be connected in a particular order, of course these processing units may be provided with any suitably connectivity—and may be distributed between two or more devices in some embodiments. That is to say, the configuration of the units as shown in FIG. 6 is entirely illustrative, and should not be regarded as being limiting.

The content identification unit 600 is operable to identify content to be displayed. In some embodiments, identifying the content to be displayed comprises identifying elements of a virtual scene that are to be displayed—for instance, identifying one or more objects within a scene, and optionally the position of those objects within the virtual scene. In some embodiments, the content identification unit 600 is operable to perform occlusion culling on the identified elements—alternatively, or in addition, occlusion culling processing may be performed by one or more other processing units (for example, the rendering unit 630).

The overlay identification unit 610 is operable to identify an overlay to be applied to at least a portion of the content to be displayed. In some embodiments, the overlay identification unit 610 is operable to identify the overlay in dependence upon a user input and/or an identified state of the content to be displayed. The state of the content may refer to any in-content conditions—for example, the user's remaining health in a game may be identified as a part of the state of the content and a GUI could be selected that relates to this (such as a red border being applied to the screen). Similarly, the state may refer to any other properties of the content—such as identifying whether a user has used a zoom function (or an item that permits it, such as a telescope or weapon scope), whether a particular interaction is taking place, the location of the user within the virtual environment, or any other suitable property.

The overlay may be a graphical user interface, for example, such as a crosshair or the like as discussed with reference to FIGS. 3 and 5. In some embodiments, the overlay is configured to obscure at least a portion of the content to be displayed—in the example of the crosshair, the outer regions of the image are obscured while the centre remains (at least substantially) unobscured. For example, the obscured portions (that is, the portions of the virtual scene that are affected by the overlay) may be blurred and/or darkened relative to one or more other portions of the content to be displayed (such as those portions of the virtual scene which are not affected by the overlay), for example.

Alternatively, or in addition, any suitable graphical effect that causes parts of the image to visibly degrade may be similarly identified, and the affected regions rendered with a lower rasterization rate. For example, a depth of focus effect, in which only objects within a predetermined range of distances from the viewpoint are shown in focus, may be used. In this case, those elements of the image with a z-value outside this range would be rendered at a lower effective resolution prior to the effect being applied. It should therefore be considered that any such effect or function may be considered an overlay as described herein. This provides an example in which obscured portions have a degraded graphical quality relative to one or more other portions of the content to be displayed.

The rasterization rate determining unit 620 is operable to determine, in dependence upon the identified overlay, a rasterization rate to be applied to each of two or more areas of at least a frame of the content to be displayed. For example, a reduced rasterization rate may be used to render the portions of the content to be displayed that are to be obscured by the overlay.

The rasterization rate to be applied to each area may be dependent upon any of a number of factors—for example, the extent of the obscuring of the content may be considered. That is, if the content is to experience a greater level of blurring or darkening or the like, then a greater reduction to the rasterization rate may be applied to the areas to be obscured. The relative rasterization rates may also be selected in dependence upon the processing power that is available for performing the rasterization—if there is limited processing power available, the rasterization rate for the areas to be obscured may be lowered by a greater amount than would otherwise be the case.

User input may also be considered, such that user preferences can be factored into the rasterization process. This can be based upon how focused a user is on the unobscured portion of the content for example—a user that is more likely to examine the obscured portion may wish to use a higher rasterization rate in that area. In some embodiments, one or more of the respective rasterization rates are determined in dependence upon the motion of a viewpoint within the content to be displayed. That is, the selected rasterization rates may be different if an in-game camera moves rather than remaining stationary. This may be advantageous in that if the camera moves rapidly, the rasterization rate in the obscured areas may be lowered as it is even less likely that the viewer will be able to identify the reduction in image quality as a result of this.

The rendering unit 630 is operable to render the content to be displayed in accordance with the determined rasterization rates. This can result in higher- and lower-quality image areas; further processing may also be applied in these areas so as to vary the respective qualities. For examples, lower-quality textures can be used in the areas in which a lower rasterization rate is to be applied.

The overlay applying unit 640 is operable to generate an image by applying the overlay to the rendered image. This process is operable to generate an image such as that shown in FIG. 5, for example.

The image output unit 650 is operable to output the image generated by the overlay applying unit 640. This image output may comprise displaying the image, uploading it to a server, or storing it for later use, for example.

The arrangement of FIG. 6 is an example of a processor (for example, a CPU located in a PC or at a server) that is operable to modify program code, and in particular is operable to:

identify content to be displayed;

identify an overlay to be applied to at least a portion of the content to be displayed;

determine, in dependence upon the identified overlay, a rasterization rate to be applied to each of two or more areas of at least a frame of the content to be displayed;

render the content to be displayed in accordance with the determined rasterization rates; and generate an image by applying the overlay to the rendered image.

Of course, rather than relying on a single processor the functionality could be distributed amongst a number of processors in one or more locations—such as a server generating an image for rendering with an overlay applied at a local games console.

Figure 7:
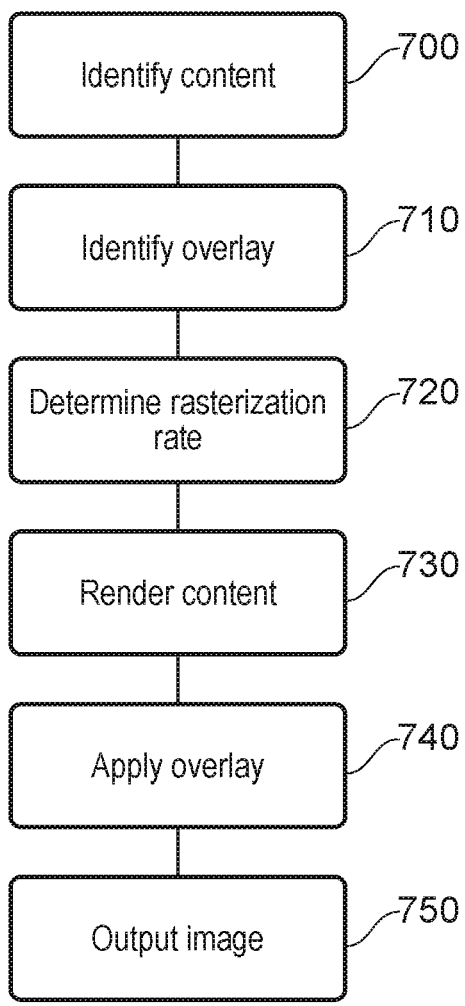
FIG. 7 schematically illustrates a method for generating images for display.

FIG. 7 schematically illustrates a method for generating images for display.

A step 700 comprises identifying content to be displayed.

A step 710 comprises identifying an overlay to be applied to at least a portion of the content to be displayed. As noted above, this overlay may comprise an image processing effect (such as a blurring function to simulate depth of field or a narrowed region of focus within the content) or any suitable GUI element.

A step 720 comprises determining, in dependence upon the identified overlay, a rasterization rate to be applied to each of two or more areas of at least a frame of the content to be displayed.

A step 730 comprises rendering the content to be displayed in accordance with the determined rasterization rates.

A step 740 comprises generating an image by applying the overlay to the rendered image.

A step 750 comprises outputting the image generated in step 740, for example via a display (for viewing) or to a storage medium.

As described above, such a method may provide a more efficient image rendering process in that one or more image areas that are to be obscured by a GUI or other overlaid image processing effect are rendered using a lower rasterization rate than one or more areas that are not obscured. This enables a reduction of the amount of processing required for those image areas, which can enable a faster rendering of the image content. Alternatively, or in addition, this may lead to a rendering in which the unobscured regions are able to be rendered with a higher rasterization rate by maintaining the overall image rendering processing time/burden in spite of the reduction in one or more areas of the image content.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for generating images corresponding to content for display, the system comprising:
    an overlay identification unit operable to identify an overlay to be applied to at least a portion of the content to be displayed, wherein the overlay is a graphical user interface object that obscures at least a portion of the content to be displayed;
    a rasterization rate determining unit operable to determine, in dependence upon the identified overlay, a rasterization rate to be applied to each of two or more areas of at least a frame of the content to be displayed;
    a rendering unit operable to render the content to be displayed in accordance with the determined rasterization rates; and
    an overlay applying unit operable to generate an image by applying the overlay to the rendered image.

2. The system of claim 1, comprising a content identification unit operable to identify content to be displayed, wherein identifying the content to be displayed comprises identifying elements of a virtual scene that are to be displayed.

3. The system of claim 2, wherein the content identification unit is operable to perform occlusion culling on the identified elements.

4. The system of claim 1, wherein the overlay identification unit is operable to identify the overlay in dependence upon a user input and/or an identified state of the content to be displayed.

5. The system of claim 1, wherein the obscured portions are blurred and/or darkened relative to one or more other portions of the content to be displayed.

6. The system of claim 1, wherein the obscured portions have a degraded graphical quality relative to one or more other portions of the content to be displayed.

7. The system of claim 1, wherein a reduced rasterization rate is used to render the portions of the content to be displayed that are to be obscured by the overlay.

8. The system of claim 1, wherein one or more of the respective rasterization rates are determined in dependence upon the motion of a viewpoint within the content to be displayed.

9. The system of claim 1, comprising an image output unit operable to output the image generated by the overlay applying unit.

10. A method for generating images for display, the method comprising:
    identifying an overlay to be applied to at least a portion of the content to be displayed, wherein the overlay is a graphical user interface object that obscures at least a portion of the content to be displayed;
    determining, in dependence upon the identified overlay, a rasterization rate to be applied to each of two or more areas of at least a frame of the content to be displayed;
    rendering the content to be displayed in accordance with the determined rasterization rates; and
    generating an image by applying the overlay to the rendered image.

11. A non-transitory machine-readable storage medium which stores computer software which, when executed by a computer, causes the computer to perform a method for generating images for display, the method comprising:
    identifying an overlay to be applied to at least a portion of the content to be displayed, wherein the overlay is a graphical user interface object that obscures at least a portion of the content to be displayed;
    determining, in dependence upon the identified overlay, a rasterization rate to be applied to each of two or more areas of at least a frame of the content to be displayed;
    rendering the content to be displayed in accordance with the determined rasterization rates; and
    generating an image by applying the overlay to the rendered image.

* * * * *